United States Patent [19]

Coutant

[11] Patent Number: 4,620,560
[45] Date of Patent: Nov. 4, 1986

[54] MODULATING RELIEF VALVE WITH DUAL FUNCTIONING LOAD PISTON
[75] Inventor: Alan R. Coutant, Chillicothe, Ill.
[73] Assignee: Caterpillar Inc., Peoria, Ill.
[21] Appl. No.: 730,887
[22] Filed: May 6, 1985
[51] Int. Cl.[4] .............................................. F16K 11/10
[52] U.S. Cl. ..................................... 137/116; 74/733; 137/118; 192/3.33; 192/199 F
[58] Field of Search ........................ 137/116, 118, 506; 74/733; 91/516; 192/3.33, 109 F

[56] References Cited

U.S. PATENT DOCUMENTS

| 3,215,236 | 11/1965 | Pensa | 192/109 F |
| 3,722,547 | 3/1973 | Kirstein | 137/625.63 |
| 3,998,111 | 12/1976 | Blake | 74/752 C |
| 4,132,302 | 1/1979 | Chatterjea | 192/87.13 |
| 4,294,278 | 10/1981 | Blake | 137/115 |
| 4,478,237 | 10/1984 | Blake et al. | 137/116.3 |

Primary Examiner—Martin P. Schwadron
Assistant Examiner—Stephen M. Hepperle
Attorney, Agent, or Firm—J. W. Burrows

[57] ABSTRACT

Fluid systems having modulating pressure relief valves ar normally needed in systems having clutches that require smooth engagement. It is also necessary in many systems to keep the sizes of components small to fit all of the necessary elements into a small area while simultaneously keeping the controls simple in construction for ease of manufacturing. The present modulating relief valve includes a housing having a dump valve, a load piston, and a relief valve spool concentrically disposed in the housing and adapted to control the rate of pressure rise of a fluid to a clutch and to further control the fluid flow to a torque converter while maintaining the system at a maximum pressure level. The load piston is operatively associated in a fluid flow controlling relation with each of the dump valve and the relief valve spool to control the flow of fluid to the torque converter and to simultaneously control the rate of pressure rise of the fluid in the clutch as well as limit the maximum system pressure. By having the elements of the modulating relief valve concentrically arranged and slidably disposed one within the other, the size of the modulating relief valve is reduced.

11 Claims, 5 Drawing Figures

MODULATING RELIEF VALVE WITH DUAL FUNCTIONING LOAD PISTON

TECHNICAL FIELD

This invention relates generally to a modulating relief valve for use in a system having fluid actuated clutches and a torque converter and more particularly to a modulating relief valve having a load piston that is operative to provide a dual function during operation.

BACKGROUND ART

Modulating pressure relief valves are frequently provided in fluid systems to control the rate of pressure rise in an actuator, such as a fluid operated clutch. It is desirable to have modulating pressure relief valves that are compact and easy to manufacture. In most conventional applications, the modulating relief valve includes a separate spool and a load piston each arranged in axially separated positions to each other in one bore. Naturally, this increases the physical size of the valve arrangement.

Other valve arrangements are known that provide compactness by having multiple valve members concentrically nested in a single bore. One of these valve arrangements provides multiple function by having three valving elements concentrically disposed one within the other. However, in this arrangement, two of the valving elements function in a flow controlling relation with the housing and only one of the valving elements functions in a flow controlling relation with one of the other valving elements. This does not allow the control of one function with respect to the control of another function.

Another of these valve arrangements provides multiple function by having several valving elements concentrically arranged in a single bore. However, this arrangement requires an external electrical signal to energize a solenoid that in turn moves one of the valving elements to initiate valve operation. Furthermore, this arrangement requires a special multipiece valving element that must cooperate with the solenoid valving element and a separate valving element. The special multipiece valving adds complexity to the valve arrangement but is required in order to maintain the compactness.

The present invention is directed to overcoming one or more of the problems as set forth above.

DISCLOSURE OF THE INVENTION

In one aspect of the present invention, a modulating relief valve is provided. The modulating relief valve has a housing defining a single bore. A dump valve, a load piston, and a relief valve spool are concentrically disposed in the single bore of the housing. The dump valve is slidably disposed in the housing and defines a bore with the load piston slidably disposed therein. The load piston defines a bore with the relief valve spool slidably disposed therein. The load piston is operatively associated with each of the dump valve and the relief valve spool in a fluid flow controlling relation when fluid flow is present.

The present invention provides a modulating relief valve that is compact in size, simple in construction and easy to manufacture while still providing the function of controlling the rate of pressure rise to a clutch and controlling the fluid flow to a torque converter. These advantages are made possible by having the dump valve, the load piston, and the relief valve concentrically disposed in a single bore with the load piston being operatively associated in fluid flow controlling relation with each of the dump valve and the relief valve to provide the above-noted functions.

BEST MODE FOR CARRYING OUT THE INVENTION

Figure 1:
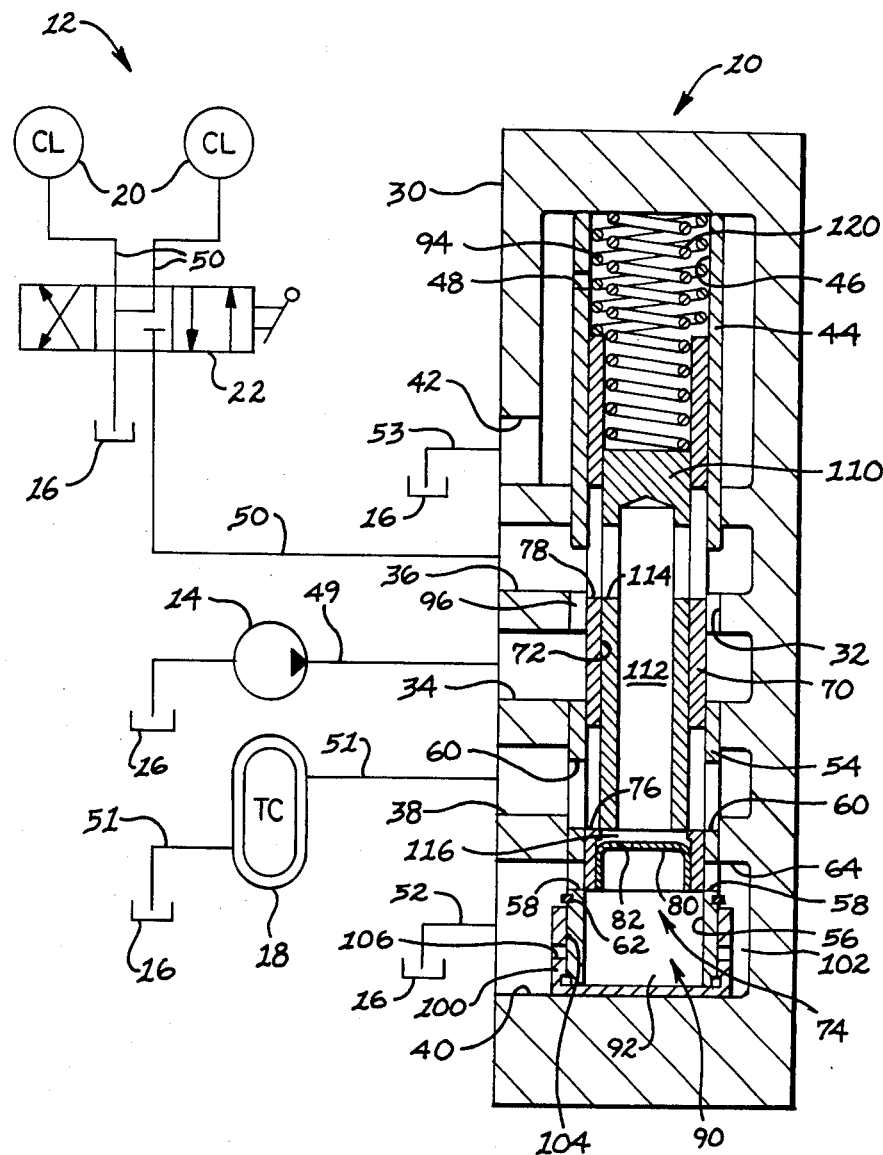
FIG. 1 is a partial schematic and diagrammatic representation of a modulating relief valve in a system incorporating an embodiment of the present invention.

Referring now to the drawings, a modulating relief valve 10 is shown for use in a hydraulic system 12 of a vehicle (not shown). The system 12 further includes a source of pressurized fluid, such as a pump 14, a reservoir 16, a torque converter 18, fluid actuated clutches 20, and a directional control valve 22.

The modulating relief valve 10 includes a housing 30 having a single bore 32 defined therein. The housing further defines an inlet port 34, first and second outlet ports 36,38 and first and second drain ports 40,42. As shown in the drawings, a sleeve member 44 is disposed in the single bore 32 and defines an axial bore 46 and a radial passageway 48 interconnecting the axial bore 46 and the drain port 42. It is recognized that the sleeve member 44 could be an integral portion of the housing 30 and that the single bore 32 could be a stepped bore without departing from the essence of the invention.

A conduit 49 connects the inlet port 34 to the pump 14 and conduits 50,51 respectively connect the first and second outlet ports 36,38 to the clutches 20 and the torque converter 18. Conduits 52,53 respectively connect the first and second drain ports 40,42 to the reservoir 16.

A dump valve 54 is located in the housing 30 and slidably disposed in the single bore 32 and movable between first and second positions. The dump valve 54 defines an axial bore 56 and first and second radial passageways 58,60 which respectively interconnect the axial bore 56 with the first drain port 40 and the second outlet port 38 when the dump valve 54 is in its first position. A snap ring 62 is removably secured around the outer surface of the dump valve 54 and is operative to contact a shoulder 64 of the housing 30 to limit the travel of the dump valve 54. It should be recognized that the dump valve 54 could be extended and replace the sleeve member 44 without departing from the essence of the invention.

A load piston 70 is located in the housing 30 and is slidably disposed within the bore 56 of the dump valve 54. The load piston 70 is also slidably disposed in the bore 46 of the sleeve member 44. However, as previously mentioned, the sleeve member 44 could be part of the housing 30 or the dump valve 54 could be extended to replace the function of the sleeve member 44. The load piston 70 defines an axial bore 72 and includes a means 74 for defining a restrictive passageway in one end of the load piston 70. The load piston 70 further defines first and second radial passageways 76,78 which respectively interconnect the axial bore 72 with the second and first outlet ports 38,36. The load piston 70 is movable between first and second positions and as illustrated in FIG. 1 the load piston is in its second position.

The defining means 74 located in the one end of the load piston 70 includes a plug member 80 which is secured in the axial bore 72 of the load piston 70 at the one end thereof. An orifice 82 is defined in the plug member 80.

Figure 2:
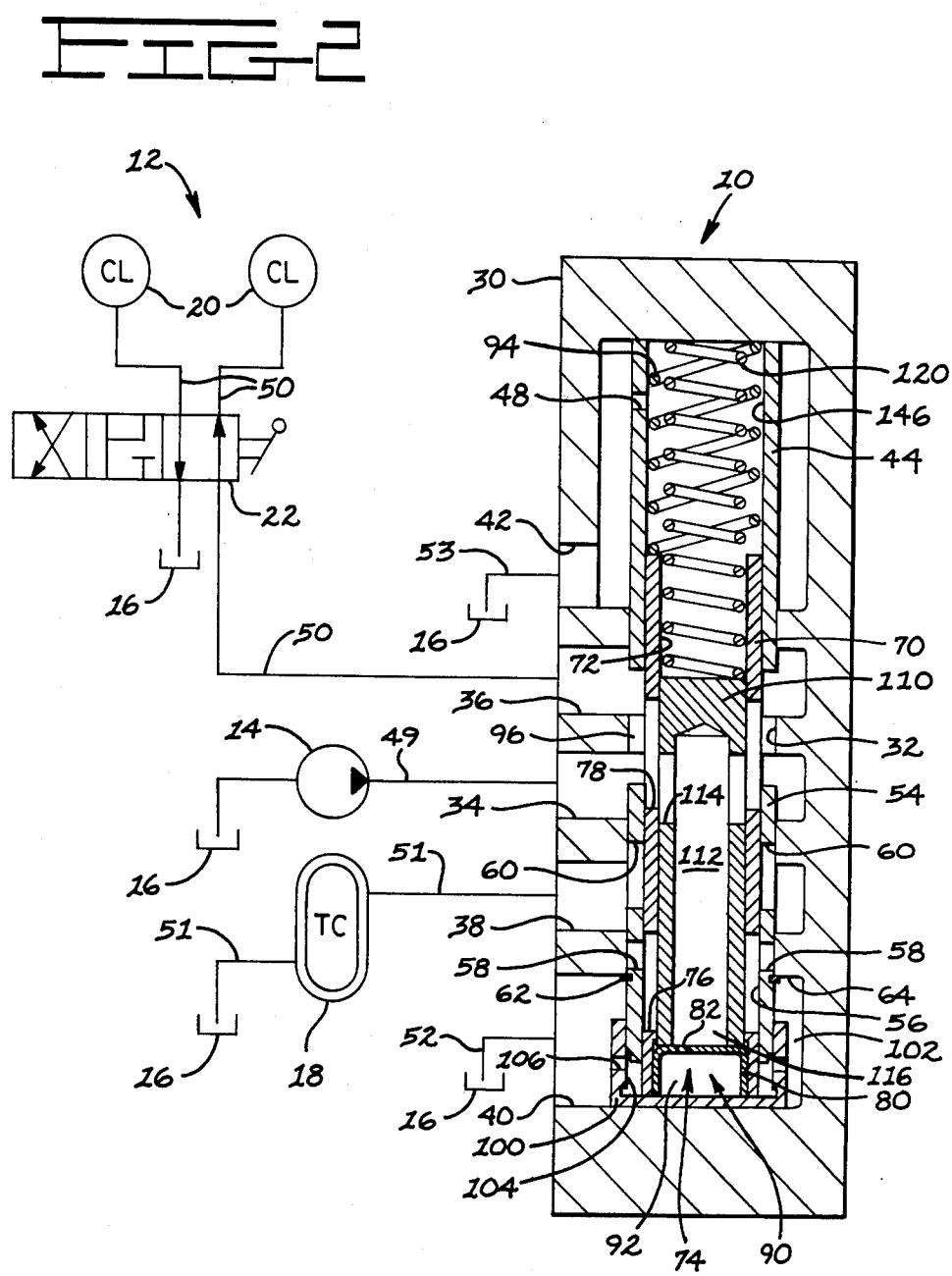
FIG. 2 is a partial schematic and diagrammatic representation of the modulating relief valve of FIG. 1 in one mode of operation.

A means 90 is provided for controllably urging the load piston 70 from its first position, as shown in FIG. 2, towards its second position. The urging means 90 includes the defining means 74 and a first pressure chamber 92. The first pressure chamber 92 is defined between the housing 30 and the one end of the load piston 70.

A first spring mechanism 94 is located between the housing 30 and the other end of the load piston 70 and is operative to bias the load piston 70 towards its first position. An annular space 96 is defined in the housing 30 circumscribing the load piston 70 and is operative to continuously communicate the inlet port 34 with the first outlet port 36.

A cup member 100 is located in a cavity 102 defined in the housing 30 and the cavity 102 is connected to the first drain port 40. The cup member 100 defines a blind bore 104 which slidably receives a portion of the dump valve 54. The cup member 100 further defines a radial passageway 106 which interconnect the blind bore 104 with the first drain port 40 through the cavity 102. It is recognized that the cup member 100 could readily be a part of the housing 30 and that the blind bore 104 would be a continuation of the single bore 32. The cup member 100 is utilized in this embodiment for simplicity of manufacturing.

A relief valve spool 110 is located in the housing 30 and is slidably disposed within the axial bore 72 of the load piston 70. The relief valve spool 110 defines an axial passageway 112 opening to one end of the relief valve and a radial passgeway 114 which interconnects the axial passageway 112 with the first exhaust port 36. The relief valve spool 110 is movable with respect to the load piston 70 between a first position and a second position. The relief valve spool 110 as illustrated in FIG. 1 is shown in its second position.

A second pressure chamber 116 is defined in the bore 72 of the load piston 70 between the one end of the relief valve spool 110 and the defining means 74 and is operative responsive to pressure in the chamber to bias the relief valve spool 110 towards the second position. A second spring mechanism 120 is located between the housing 30 and the other end of the relief valve spool 110 and is operative to bias the relief valve spool 110 towards its first position.

Figures 3, 4:
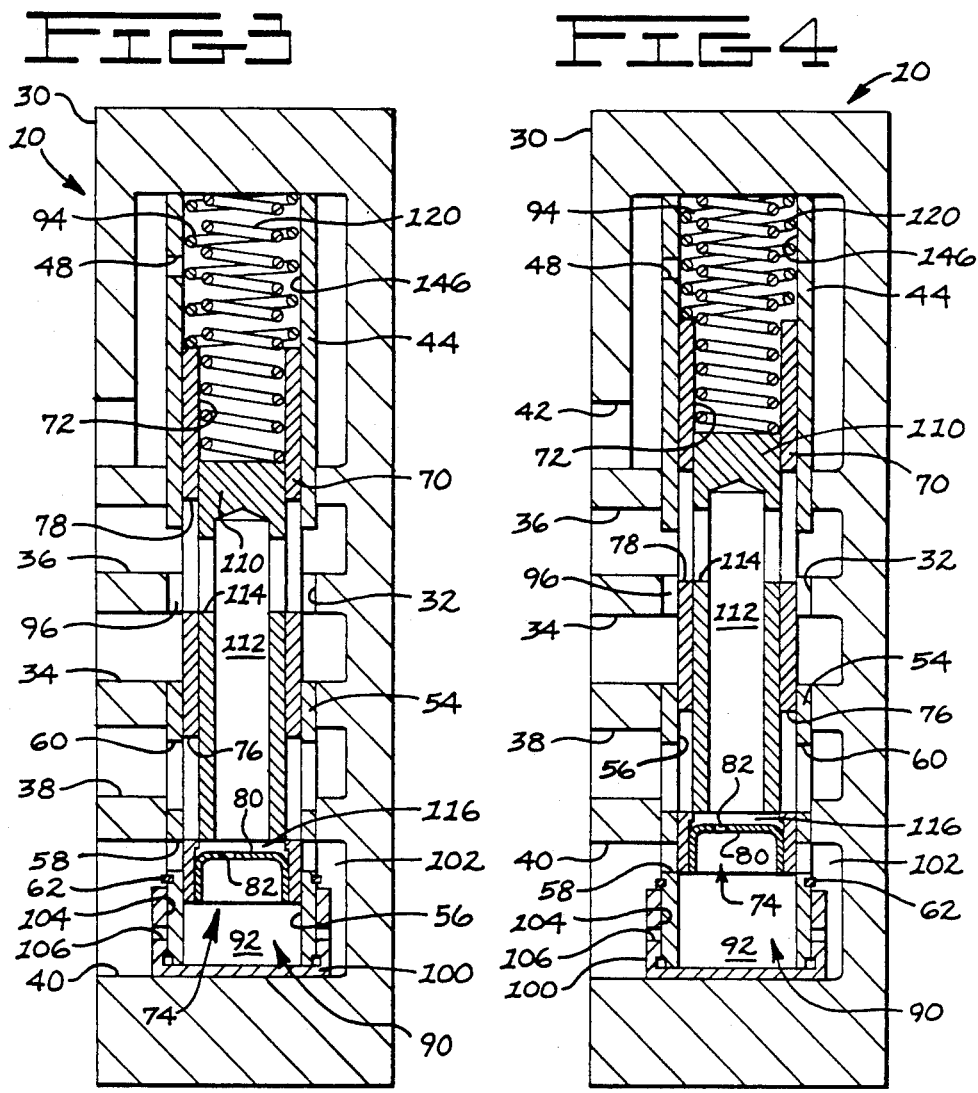
FIGS. 3 and 4 are diagrammatic representations of the modulating relief valve of FIG. 2 shown in various stages of the one mode of operation.

Referring specifically to FIG. 2, the associated system 12 is shown in an operative position and the modulating relief valve 10 is shown in one mode of operation. More specifically, the control valve 22 is moved to a position to direct pressurized fluid to one of the clutches 20 and the dump valve 54 is shown in its second position while the load piston 70 and the relief valve spool 110 are each shown in their respective first positions. FIGS. 3 and 4 respectively show various elements of the modulating relief valve 10 in different operative positions as one of the clutches 20 is being filled with fluid and pressurized. The various operative positions of the elements in the modulating relief valve 10 will be explained more fully hereinafter.

Figure 5:
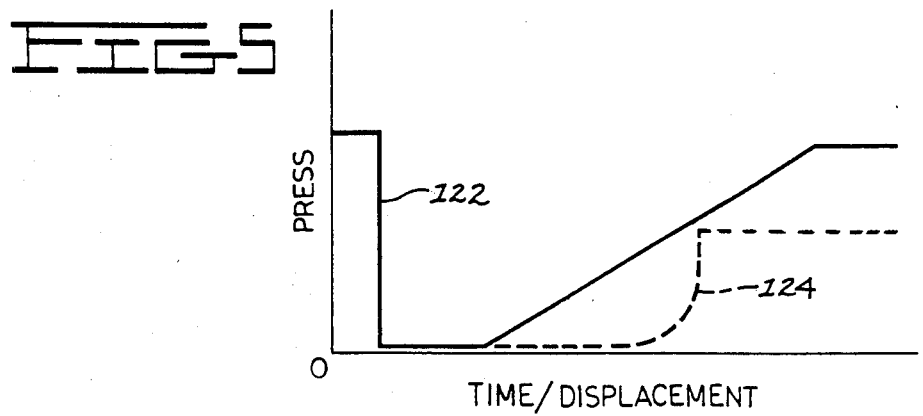
FIG. 5 is a graph illustrating the relationship between the operating pressure of a fluid clutch versus time, plus the relationship of the pressure of a fluid to a torque converter to the load piston travel.

Referring to FIG. 5, a solid line 122 represents the pressure level versus time of the fluid from the pump 14 to one of the clutches 20 as it is being filled and fully engaged versus time. A dashed line 124 represents the pressure level of the fluid to the torque converter 18 with respect to the displacement of the load piston 70.

INDUSTRIAL APPLICABILITY

During the neutral condition of the fluid system 12 as shown in FIG. 1, pressurized fluid from the pump 14 is directed to the control valve 22 via the conduit 49, the inlet port 34, the annular space 96, the outlet port 38, and the conduit 50. As illustrated in FIG. 1, the control valve 22 is in the center blocking position. With the control valve 22 in its center or neutral position, the modulating relief valve 10 operates to maintain the fluid level at a predetermined maximum pressure. The pressure of the fluid at the first outlet port 36 is directed through the second radial passageway 78 of the dump spool 70, the radial passageway 114 of the relief valve spool 110, and the axial passageway 112 of the relief valve spool 110 to the second pressure chamber 116. The pressure of the fluid in the second pressure chamber 116 provides an effective force acting on the one end of the relief valve spool 110 to urge the relief valve spool 110 towards the second position against the bias of the second spring mechanism 120. Simultaneously therewith the fluid pressure in the second pressure chamber 116 is directed across the orifice 82 into the first pressure chamber 92. The pressure of the fluid in the first pressure chamber 92 provides an effective force acting on the one end of the load piston 70 to move it towards its second position against the bias of the first spring mechanism 94. As the pressure increases to its maximum level, both the relief valve spool 110 and the load piston 70 moves to their respective second positions as best illustrated in FIG. 1.

The travel of the load piston 70 against the first spring mechanism 94 is limited since the first pressure chamber 92 is controllably vented to the reservoir 16 by the cooperation of the one end of the load piston 70 and the radial passageway 58 of the dump valve 54. The pressure of the fluid in the first pressure chamber 92 will be maintained by this controllable venting at a pressure level sufficient to resist the biasing force of the first spring mechanism 94. Similarly, the relief valve spool 110 establishes a maximum pressure level in the outlet port 38 by the cooperation of the one end of the relief valve spool 110 and the first radial passageway 76 of the load piston 70. The pressure of the fluid in the second pressure chamber 116 will be maintained at a level sufficient to resist the biasing force of the second spring mechanism 120. The relief valve spool 110 will establish a position with respect to the load piston 70 to maintain the predetermined maximum pressure level in the first outlet port 36 while bypassing the remainder of the fluid to the second outlet port 38 and subsequently to the torque converter 18.

Referring now to FIG. 2, the control valve 22 is moved to an operative position and one of the clutches 20 begins to fill. Since the one clutch 20 is filling, the pressure of the fluid in the first outlet port 36 drops to a pressure level near zero. Consequently, the pressure level of the fluid in the second pressure chamber 116 drops to the same level. The fluid pressure in the first pressure chamber 92 is being reduced at the same time, but due to the orifice 82 located between the first and second pressure chambers 92,116, the pressure level in the first pressure chamber 92 cannot be reduced as quickly. Because one end of the dump valve 54 is exposed to the same fluid as that of the outlet port 36 and the other end of the dump valve 54 is exposed to the higher fluid pressure in the first pressure chamber 92, the dump valve 54 will move from the first position as shown in FIG. 1 to its second position as shown in FIG. 2. The movement of the dump valve 54 to its second position opens the communication of the first pressure chamber 92 with the first drain port 40 through the radial passageway 106 of the cup member 100. Consequently, the load piston and the relief valve spool 110 are quickly moved to their respective first positions as illustrated in FIG. 2. During this mode of filling of the one clutch 20, all fluid flow is blocked from the torque converter 18 and the system pressure is maintained at a level near zero as illustrated by the lower portions of the solid and dashed lines 122,124 in FIG. 5.

Once the clutch 20 is filled, the pressure level of the fluid in the one clutch 20 begins to rise. Any initial rise of the pressure level of the fluid in the clutch 20 results in the dump valve 54 returning to its initial first position as illustrated in FIGS. 3 and 4. The effective force needed to move the dump valve 54 to its first position from its second position is provided by the differential pressure created by the resistance of fluid flow across the orifice 82. Consequently a higher force, as created by the initial rise in pressure of the one clutch 20, is subjected to the one end of the dump valve 54 while the other end is still subjected to the lower pressure of the fluid in the first pressure chamber 92 that is still maintaining communication with the reservoir 16. Once the dump valve 54 is closed, the load piston 70 begins to move from the first position shown in FIG. 2 towards the second position as shown in FIG. 4. The slope of the solid line of the graph in FIG. 5 depicts the increase in pressure of the fluid in the clutch 20 versus time as the load piston is moving between its first and second positions. The angle of this slope is determined primarily by the size of the orifice 82 and the spring rate of the first spring mechanism 94.

Simultaneously, upon initial increase of pressure in the fluid clutch 20, the relief valve spool 110 moves relative to the load piston 70 from its first position, shown in FIG. 2, to its second position as shown in FIGS. 3 and 4. As the load piston 70 moves from its first position towards its second position, the relief valve spool 110 is progressively moved along with the load piston 70 due to the pressure level of the fluid in the second pressure chamber 116. The pressure level of the fluid in the second pressure chamber 116 increases to a level sufficient to overcome the force of the second spring mechanism 120 and bypasses fluid from the second pressure chamber 116 to the first radial passageway 76 of the load piston 70 and subsequently to the reservoir 16 across the first radial passageway 58 of the dump valve 54. Note, that the bypassed fluid from the second pressure chamber 116 is also available to the torque converter 18 through the second radial passageway 60 of the dump valve 54 and the second outlet port 38 of the housing 30. However, the fluid will not go to the torque converter 18 due to the resistance of the fluid flow through the torque converter 18. As is well known, fluid always flows through the path of least resistance, which in this embodiment is to the reservoir 16. This relationship continues until the load piston 70 reaches the position as illustrated in FIG. 3. At this position, the fluid being bypassed from the second pressure chamber 116 through the first radial passageway 76 of the load piston 70 is blocked from the reservoir 16 and is directed to the torque converter 18 through the second outlet port 38. This relationship is best shown in the graph of FIG. 5 by the change in direction of the dashed line 124 from the horizontal direction to a vertical direction. The maximum pressure level of the fluid being directed to the torque converter is established by the total resistance of fluid flow through the torque converter 18.

As the pressure level of the fluid in the clutch 20 continues to rise, the load piston 70 continues moving towards the second position as shown in FIG. 4. As previously noted, the relief valve spool 110 is moving in conjunction with the load piston 70 to provide a pressure level in the second pressure chamber 116 to overcome the increasing force of the second spring mechanism 120. Since the second pressure chamber 116 and the fluid actuated clutch 20 are in open communication, the pressure of the fluid in both increases at the same rate. Any excess fluid flow is bypassed through the second outlet port 38 to the torque converter 18. Once the load piston 70 moves to the position at which the one end of the load piston 70 communicates the first pressure chamber 92 with the radial passageway 58 of the dump valve 54, the pressure level of the fluid in the first pressure chamber 92 is maintained at the level necessary to hold the load piston 70 in the position as illustrated in FIG. 4. If the pressure level of the fluid in the first pressure chamber 92 increases, the load piston 70 moves upwards and opens a larger area between the end of the load piston 70 and the radial passageway 58 allowing more fluid flow to be bypassed from the first pressure chamber 92 thus decreasing the pressure level with a corresponding repositioning of the load piston 70 downwardly to cut off the bypass flow. Consequently, the load piston 70 maintains a position sufficient to bypass an amount of fluid necessary to maintain the pressure level of the fluid in the first pressure chamber 92 sufficient to overcome the force of the first spring mechanism 94.

The modulating relief valve 10, as set forth above, provides an arrangement that is compact in size, simple in construction and easy to manufacture while still providing the function of controlling the rate of pressure rise in the clutch 20, limiting the maximum system pressure, and controlling the flow of fluid to the torque converter 18. By having the dump valve 54, the load piston 70, and the relief valve spool 110 all arranged in a single bore 32 in a concentric relationship, and having the load piston 70 operatively cooperate in fluid flow controlling relation with each of the dump valve 54 and the relief valve spool 110, the advantages set forth above are readily accomplished.

Other aspects, objects and advantages of this invention can be obtained from a study of the drawings, the disclosure and the appended claims.

I claim:

1. A modulating relief valve, comprising:
   a housing defining a single bore;
   a dump valve, a load piston, and a relief valve spool each concentrically disposed in the single bore of the housing;
   the dump valve being slidably disposed in the single bore of the housing and defines a bore with the load piston slidably disposed in the bore of the dump valve;

the load piston defines a bore with the relief valve spool slidably disposed in the bore of the load piston; and the load piston, the dump valve, and the relief valve spool each being movable relative to the other and the interface of the load piston with each of the dump valve and the relief valve spool controls fluid flow when fluid flow is present.

2. The modulating relief valve, as set forth in claim 1, including means for controllably urging the load piston from a first position toward a second position.

3. The modulating relief valve, as set forth in claim 2, wherein said urging means includes means for defining a restrictive passageway and a pressure chamber located between the housing and one end of the load piston, said defining means being located in the load piston at the one end.

4. The modulating relief valve, as set forth in claim 3, including a spring mechanism located between the housing and the other end of the load piston and operative to bias the load piston from the second position to the first position.

5. The modulating relief valve, as set forth in claim 4, including a second pressure chamber defined between the defining means in the load piston and one end of the relief valve spool and operative selectively to move the relief valve spool relative to the load piston from a first position to a second position.

6. The modulating relief valve, as set forth in claim 5, including a second spring mechanism located between the housing and tne other end of the relief valve spool and operative to bias the relief valve spool from the second position to the first position.

7. The modulating relief valve, as set forth in claim 6, including a drain port located in the housing and connected to the first pressure chamber, and wherein said dump valve is movable between a first position at which the first pressure chamber is blocked from the drain port and a second position at which the first pressure chamber is open to the drain port.

8. The modulating relief valve, as set forth in claim 7, in combination with a system having a source of pressurized fluid, a fluid actuated clutch, a torque converter, and a reservoir; and wherein the housing of the modulating relief valve includes an inlet port connected to tne source, a first outlet port connected to the fluid actuated cluth, and a second outlet port connected to the torque converter, each of the ports intersect the single bore of the housing.

9. The modulating relief valve, as set forth in claim 8 wherein the source of pressurized fluid is in continuous communication with the first outlet port and is controllably connected to the torque converter and the reservoir respectively by the second outlet port and the drain port.

10. The modulating relief valve, as set forth in claim 9, wherein the load piston is movable relative to the dump valve during a portion of the rate of pressure rise for a predetermined length of travel and operative to effectively bypass the torque converter.

11. The modulating relief valve, as set forth in claim 10, wherein the dump valve defines an axial bore and a radial passageway intersecting the axial bore and when the dump valve is in its first position, the one end of the load piston acting in cooperation with the radial passageway controllably communicates the first pressure chamber with the drain port to limit the travel of the load piston and effectively limit the maximum pressure of the fluid to the fluid actuated clutch.

* * * * *